(12) United States Patent
Weiss

(10) Patent No.: US 8,191,047 B2
(45) Date of Patent: May 29, 2012

(54) MULTI-TIERED CERTIFICATION SERVICE

(75) Inventor: Bernhard Weiss, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1236 days.

(21) Appl. No.: 11/871,002

(22) Filed: Oct. 11, 2007

(65) Prior Publication Data

US 2009/0100412 A1 Apr. 16, 2009

(51) Int. Cl.
*G06F 9/44* (2006.01)

(52) U.S. Cl. ......................................... 717/126

(58) Field of Classification Search ........... 717/120–135
See application file for complete search history.

(56) References Cited

U.S. PATENT DOCUMENTS 6,862,696 B1 * 3/2005 Voas et al. .................. 714/38.11
2006/0282823 A1 * 12/2006 Li et al. ........................ 717/121

OTHER PUBLICATIONS

The Open Group, "Common Operating Environment (COE)—Platform Certification Program—Certification Policy", Oct. 2003, The Open Group, pp. 1-23.*

Ma et al, "Framework for Third Party Testing of Component Software", 2001, IEEE, pp. 431-434.*

* cited by examiner

*Primary Examiner* — Ted T Vo

(74) *Attorney, Agent, or Firm* — Brake Hughes Bellermann LLP

(57) ABSTRACT

A method for certifying whether a software solution is compatible with an operating environment that includes one or more backend systems associated with a software product. Provide an advanced certification routine including a plurality of tests associated with determining a compatibility between the software solution and the software product and including access to the one or more backend systems. Provide a basic certification routine associated with determining a compatibility between the software solution and the software product without access to the one or more backend systems, wherein the basic certification includes a subset of the plurality of tests associated with the advanced certification routine. Receive a request associated with certifying the software solution based on the advanced certification routine or the basic certification routine. Certify whether the software solution is compatible with the operating environment based on a performance of the advanced certification routine or basic certification routine as determined from the request.

17 Claims, 4 Drawing Sheets

100

MULTI-TIERED CERTIFICATION SERVICE

TECHNICAL FIELD

This description relates certification of software and, in particular, to a multi-tiered certification service.

BACKGROUND

With the growth of the number of different software applications produced by different software vendors, there may come a time when a first software vendor would want to integrate a first software application with a second software application from a second software vendor. It may be the case, for example, that the second software application may have an existing customer base that the first software vendor may want to reach by developing an enhancement or add-on (e.g., first software application) to the second software application. However, prior to allowing the first software vendor's application to be integrated with the second software application, the second software vendor may require or prefer a certification that the first software application is designed to a set of specifications associated with the second software application.

The certification may include a set of tests to be performed on the first software application to make sure the first software application adheres to the specifications or standards associated with the second software application. However, different software vendors may prefer different levels of integration with regards to the second software application. For example, a software application A may be designed from scratch specifically for integration with the second software application, while software application B may have been a standalone application (or designed to integrate with system), in which case it may be preferable that application B may be certified by a different set of standards or tests for use with the second software application.

SUMMARY

According to an example embodiment a method for certifying whether a software solution is compatible with an operating environment that includes one or more backend systems associated with a software product is provided. An advanced certification routine including a plurality of tests associated with determining a compatibility between the software solution and the software product and including access to the one or more backend systems may be provided. A basic certification routine associated with determining a compatibility between the software solution and the software product without access to the one or more backend systems, wherein the basic certification includes a subset of the plurality of tests associated with the advanced certification routine may be provided. A request associated with certifying the software solution based on the advanced certification routine or the basic certification routine may be received. It may be certified whether the software solution is compatible with the operating environment based on a performance of the advanced certification routine or basic certification routine as determined from the request.

According to another example embodiment, a certification system for certifying a software solution for operation with a software product is provided. A definition engine may be configured to define a plurality of tests based on a plurality of operational standards associated with the software product. A design module may be configured to group one or more of the tests into a plurality of certification routines, including an interface certification, a first advanced certification routine, a basic certification routine and a second advanced certification routine. The interface certification routine may be configured for determining a consistency between an interface of the software solution and an interface of the software product. The first advanced certification routine may be associated with determining whether the software product is compatible with operational standards associated with an operating environment of the software product. The basic certification routine may be associated routine with determining whether the software product is compatible with a portion of the operational standards associated with the operating environment of the software product. The second advanced certification routine may comprise the basic certification and the interface certification. A certification engine may be configured to determine which of the first advanced certification, the second advanced certification or the basic certification by which to certify the software solution for operation with the software product.

According to another example embodiment a method for certifying a software solution for operation in association with a software product is provided. A first determination may be made as to whether the software solution is configured to operate consistently with a first subset of operating standards associated with an operating environment of the software product corresponding to a basic certification routine or a second subset of the operating standards corresponding to an advanced certification routine. A consistency level may be determined between the software solution and the operating standards based on the first determination. A second determination that the software solution corresponds to the advanced certification routine or the basic certification routine may be made based on the consistency level. Based on the second determination, the software solution for operation in association with the software product may be certified.

The details of one or more implementations are set forth in the accompanying drawings and the description below. Other features will be apparent from the description and drawings, and from the claims.

DETAILED DESCRIPTION

Figure 1:
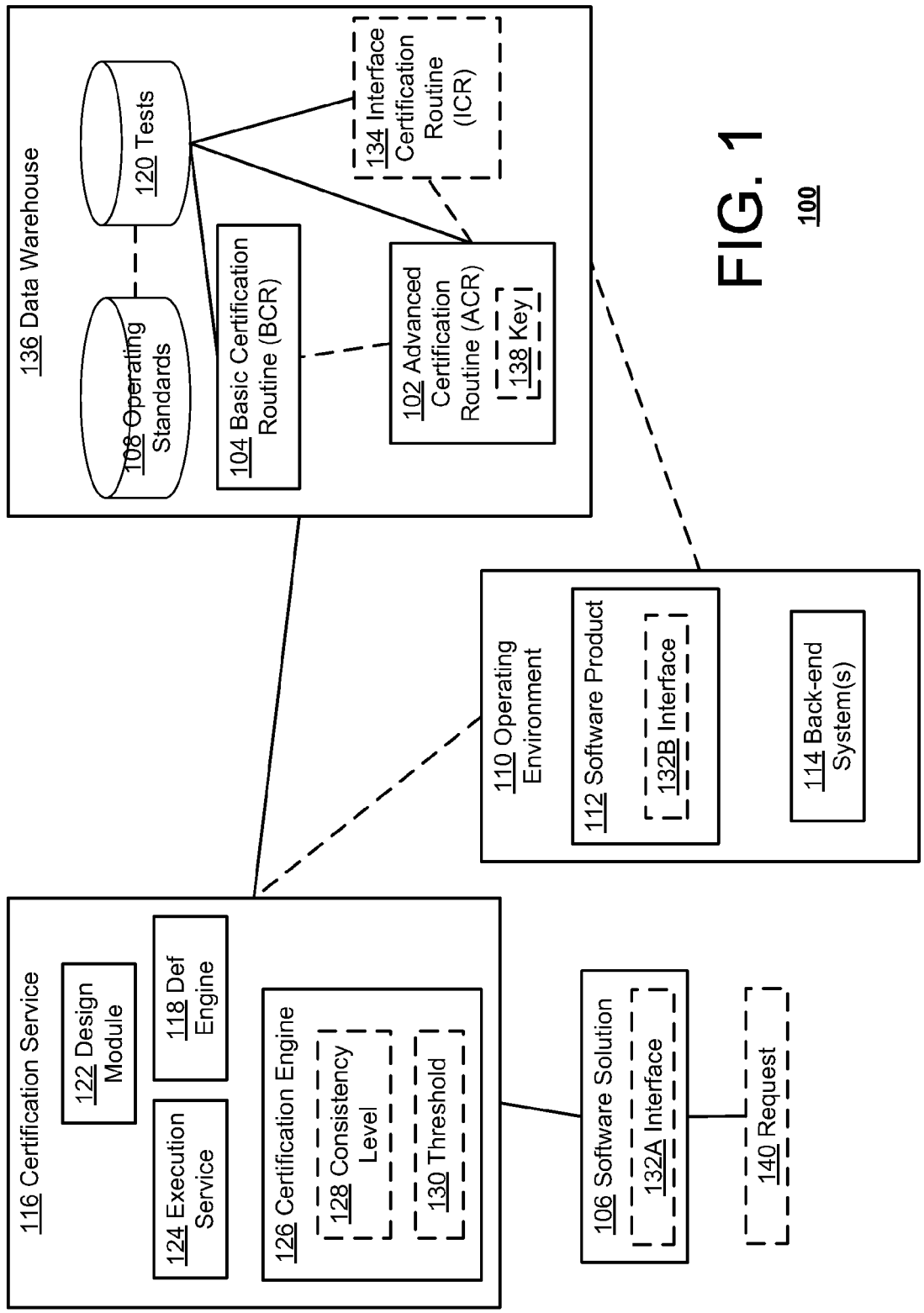
FIG. 1 is a block diagram of an example multi-tiered certification system, according to an example embodiment.

FIG. 1 is a block diagram of an example multi-tiered certification system 100, according to an example embodiment. In the example of FIG. 1, the system 100 may include an advanced certification routine (ACR) 102 and a basic certification routine (BCR) 104. The ACR 102 and BCR 104 may be used for example, to certify whether a software solution 106 is operable or otherwise compatible with operating standards 108 associated with an operating environment 110 of a software product 112. For example, a third party developer may integrate the operating standards 108 into the operation and/or or execution of the software solution 106. Then, for example, based on the level of integration between the software solution 106 and the operating standards 108, the software solution 106 may be certified by the system 100 under the ACR 102 or the BCR 104, whereby the ACR 102 may signal a deeper and/or tighter integration between the software solution 106 and the operating standards 108 than the BCR 104.

According to an example embodiment, the ACR 102 and BCR 104 may comprise a two-tiered certification system 100 for certifying the software solution 106 for operation with one or more portions of the software product 112. For example, the ACR 102 may certify the software solution 106 for operation with both basic and advanced features of the operating environment 110 and/or software product 112, while the BCR 108 may certify the software solution 106 for operation with only the basic features of the operating environment 110 and/or software product 112.

As referenced above, the advanced certification routine (ACR) 102 may include a plurality of tests for determining whether the software solution 106 is compatible or otherwise operable with one or more features of the operating environment 110. For example, the ACR 102 may be used to determine whether the software solution 106 has been integrated to such a level with the operating standards 108 such that it may be trusted to access one or more advanced features (e.g., back-end system(s) 114) of the operating environment 110 in addition to the accessing or operating in association with the software product 112.

Similar to the ACR 102, the BCR 104 may include a plurality of tests for determining whether the software solution 106 is compatible or otherwise operable with one or more features of the operating environment 110. The BCR 104 may, however, include a subset of the tests of the ACR 102. Then, for example, the BCR 104 may be used to determine the compatibility between the software solution 106 and one or more basic features of the operating environment 110, such as operating in association with the software product 112 without access to the back-end system(s) 114.

The software solution 106 may include any software application, program, product, code or other module or system configured to operate according to one or more of the operating standards 108. As referenced above, the software solution 106 may include a third-party product configured for operation with the software product 112, whereby the software solution 106 has been configured based on the operating standards 108 associated with the software product 112. For example, the software solution 106 may include an add-on, extension, plug-in, enhancement or other program associated with the software product 112. Then, for example, prior to allowing the software solution 106 to operate with the software product 112, the system 100 may certify the software solution 106 for operation with the software product 112 based on the ACR 102 and/or BCR 104.

The operating standards 108 may include a technique and/or set of guidelines for operating within the operating environment 110. The operating standards 108 may include, for example, how an application configured for operation in the operating environment 110 is to deploy, the look-and-feel of the application (or interface), how the application is to handle and process errors, and/or other operational features. Then, for example, an application (e.g., software product 112 and/or software solution 106) configured to operate in the operating environment 110 may first be configured based on the operating standards 108.

The operating environment 110 may include an environment in which the software product 112 is run. The operating environment 110 may include a browser, a command line interface, other graphical user interface or operating system. For example, the operating environment 110 may include a Java Enterprise Edition (e.g., J2EE) operating environment, Enterprise Java Beans (EJBs), web archives (WARs), servlets, server pages, filters, Javascript and/or SAP Netweaver and/or other operating environments. Then, for example, if the operating environment 110 is a J2EE operating environment, the software solution 106 may be a J2EE compatible application and the operating standards 108 may include guidelines about how the software solution 106 is to operate within the J2EE environment (e.g., 110). For example, the operating standards 108 may include guidelines or requirements about which libraries and/or methods to call from the software solution 106 to perform one or more tasks. However, prior to allowing the software solution 106 to operate within the operating environment 110, the multi-tiered certification system 100 may determine whether the software solution 106 passes the tests of the BCR 104 or ACR 102.

The software product 112 may include a software application, program, product, code or other module or system configured to operate in the operating environment 110. For example, the software product 112 may include a customer relationship management (CRM) program operating in a J2EE operating environment 110, and the software solution 106 may be a J2EE application configured to operate in association with the CRM program 112. However, as referenced above, prior to allowing the software solution 106 to operate in association with the CRM program 112, the software solution 106 may first be certified under the ACR 102 or BCR 104.

The ACR 102 and BCR 104 may be offered as a two-tiered certification system for certifying the software solution 106 for operation or compatibility with the operating environment 110. For example, depending on the level of integration between the software solution 106 and the operating standards 108, the software solution 106 may be certified using the ACR 102 and the BCR 104. According to an example embodiment, the software product 112 may have customers who are already familiar with operating the software product 112. As such, the software solution 106 may be developed to reach at least a portion of those customers. A certification of the software solution 106 under the ACR 102 may allow the customers to quickly recognize that the software solution 106 includes a tighter integration between the operating standards 108 with which the customer may already be familiar, than a BCR 104 certification. This may increase the reliability, marketing ability and/or sales of the software solution 106 by being able to claim the tighter ACR 102 integration.

As referenced above, certification under the ACR 102 may certify the software solution 106 for access to the one or more back-end system(s) 114, which would not be accessible under the BCR 104 certification. The back-end system(s) 114 may include one or more features associated with the operating environment 110 and/or software product 112. For example, the back-end system(s) 114 may include proprietary features of the software product 112, a database and/or other information or security sensitive information. For example, if the software product 112 is a CRM system, the back-end system(s) 114 may include record and/or business object(s) associated with the CRM system.

The multi-tiered certification system 100 may include a certification service 116. The certification service 116, including one or more of its components, may determine whether or not to certify the software solution 106 for operation within the operating environment 110 based on the ACR 102 and BCR 104. In other example embodiments, there may be more and/or different certification routines other than the ACR 102 and BCR 104.

A definition engine 118 may define or otherwise determine which tests 120 are associated with the certification routines (e.g., ACR 102 and/or BCR 104). The definition engine 118 may, for example, define, based on the operating standards 108, the tests 120 to be performed on the software solution 106 with regards to the ACR 102 and/or BCR 104. For example, if the operating standards 108 specify that the software solution 106 is to log errors using a specified constructor, the definition engine 118 may define a test for determining whether or not the software solution 106 uses the specified error logging constructor.

The tests 120 may include tests, checks or other assessment criteria by which to determine if the software solution 106 complies with the ACR 102 and/or BCR 104. For example, the ACR 102 may include a test to determine whether the software solution 106 includes one particular specified deployment descriptor that may be used to deploy the software solution 106 within the operating environment 110. Correspondingly, the BCR 104 may include a test to determine whether the software solution 106 includes any one of several possible deployment descriptors that may be used to deploy the software solution 106 within the operating environment 110.

A design module 122 may group one or more of the tests 120 into the certification routines (e.g., ACR 102 and/or BCR 104). For example, the design module 122 may determine which of the tests 120 are associated with each certification routine. The design module 122 may determine a first set of tests 120 associated with the ACR 102, and then determine a subset of the first set of tests 120 for the BCR 104. For example, the ACR 102, requiring a tighter integration between the software solution 106 and the operating standards 108, may specify that a particular function (e.g., deployment descriptor as described above) be used, while the BCR 104 may allow the software solution 106 to use any one of several acceptable functions (e.g., deployment descriptors).

An execution service 124 may perform or otherwise execute the tests 120. For example, the execution service 124 may perform the tests 120 with regards to the software solution 106. Then, for example, based on the executed tests 120, a certification engine 126 may determine a consistency level 128 between the software solution 106 and the ACR 102 and/or the BCR 104.

The consistency level 128 may include a gauge or measure of the consistency and/or integration between the software solution 106 and the operating standards 108 (e.g., as a percentage of tests passed). The certification engine 126 may determine the consistency level 128 based on the execution of the tests 120 by the execution service 124. Then, for example, the certification engine 126 may determine whether or not the software solution 106 passes the ACR 102 or BCR 104 based on the consistency level 128.

According to an example embodiment, the certification engine 126 may determine whether or not the software solution 106 passes the ACR 102 or BCR 104 based on a comparison of the consistency level 128 to a threshold 130. The threshold 130 may be a minimum level of correspondence that the software solution 106 is to satisfy to be certified to operate in association with the software product 112 and/or the operating environment 110. According to an example embodiment, there may be different thresholds 130, one for the ACR 102 and one for the BCR 104. Then, for example, if the certification engine 126 may determine whether the consistency level 128 is greater than or equal to the threshold consistency level 130 and may certify (or otherwise deny certification) to the software solution 106 correspondingly under the ACR 102 and/or BCR 104.

According to an example embodiment, the software solution 106 and the software product 112 may each be associated with an interface 132A and 132B, respectively. The interfaces 132A and 132B may include user interfaces associated with the software solution 106 and the software product 112, respectively. For example, the interfaces 132A and 132B may include graphical user interfaces (GUIs). According to an example embodiment, the interface 132B of the software product 112 may have a particular look-and-feel associated with one or more of the operating standards 108. Then, for example, a data warehouse 136 may include an interface certification routine (ICR) 134 corresponding to the look-and-feel of the interface 132B.

The ICR 134 may include one or more tests (e.g., 120) for determining if the interface 132A of the software solution 106 is consistent with the interface 132B of the software product 112. For example, as referenced above, there may be customers who are already using the software product 112 and familiar with the interface 132B. Then, for example, for the software solution 106 to be associated with the software product 112, the multi-tiered certification system 100 may require that the look-and-feel of the interface 132A is consistent with the look-and-feel of the interface 132B, such that customers are more comfortable with the software solution 106. The certification service 116 may determine whether the look-and-feel of the interfaces 132A and 132B are consistent based on the ICR 134 (which may be part of an advanced certification routine (ACR) 102).

The data warehouse 136 can represent one or more of a database, memory or other storage device(s) containing information related to the multi-tiered certification system 100. For example, the data warehouse 136 may contain the operating standards 108, tests 120 and/or one or more of the certification routines (e.g., ACR 102, BCR 104 and/or ICR 134).

According to an example embodiment, the multi-tiered certification system 100 may provide the software solution 106 with a key 138 if it passes the ACR 102. The key 138 may include any password, combination, token or other permission to access the back-end system(s) 114. For example, access to the back-end system(s) 114 may require a user name and/or password (e.g., key 138). In other example embodiments, the key 138 may be used to access the operating environment 110 and may be associated with both the ACR 102 and BCR 104, or there may be no key 138 necessary.

A request 140 may be received by the certification service 116 regarding certifying the software solution 106. The request 140 may include any request to certify the software solution 106. The request 140 may include, for example, an identification of the software solution 106 and a request as to whether the software solution 106 is to be certified under the ACR 102 or the BCR 104. Then, for example, based on the request 140, the certification service 116 may determine whether or not to certify the software solution 106.

Certifying the software solution 106 prior to allowing it to operate or otherwise be integrated with the operating environment 110 and/or software product 112 may help to prevent against operational problems and/or customer confusion. However, offering a multi-tiered certification system (e.g., 100) may allow a software solution provider the option of deciding how tightly to integrate the software solution 106 with the operating standards 108. For example, a general use software solution (e.g., 106) that is configured or modified to operate on the operating environment 110 may prefer to have the basic certification routine (BCR) 104 certification. Meanwhile, a software solution (e.g., 106) designed specifically for the operating environment 110 may prefer to be certified under the advanced certification routine (ACR) 102, as discussed above. In other example embodiments, there may be more than two tiers to the certification system 100.

Figure 2:
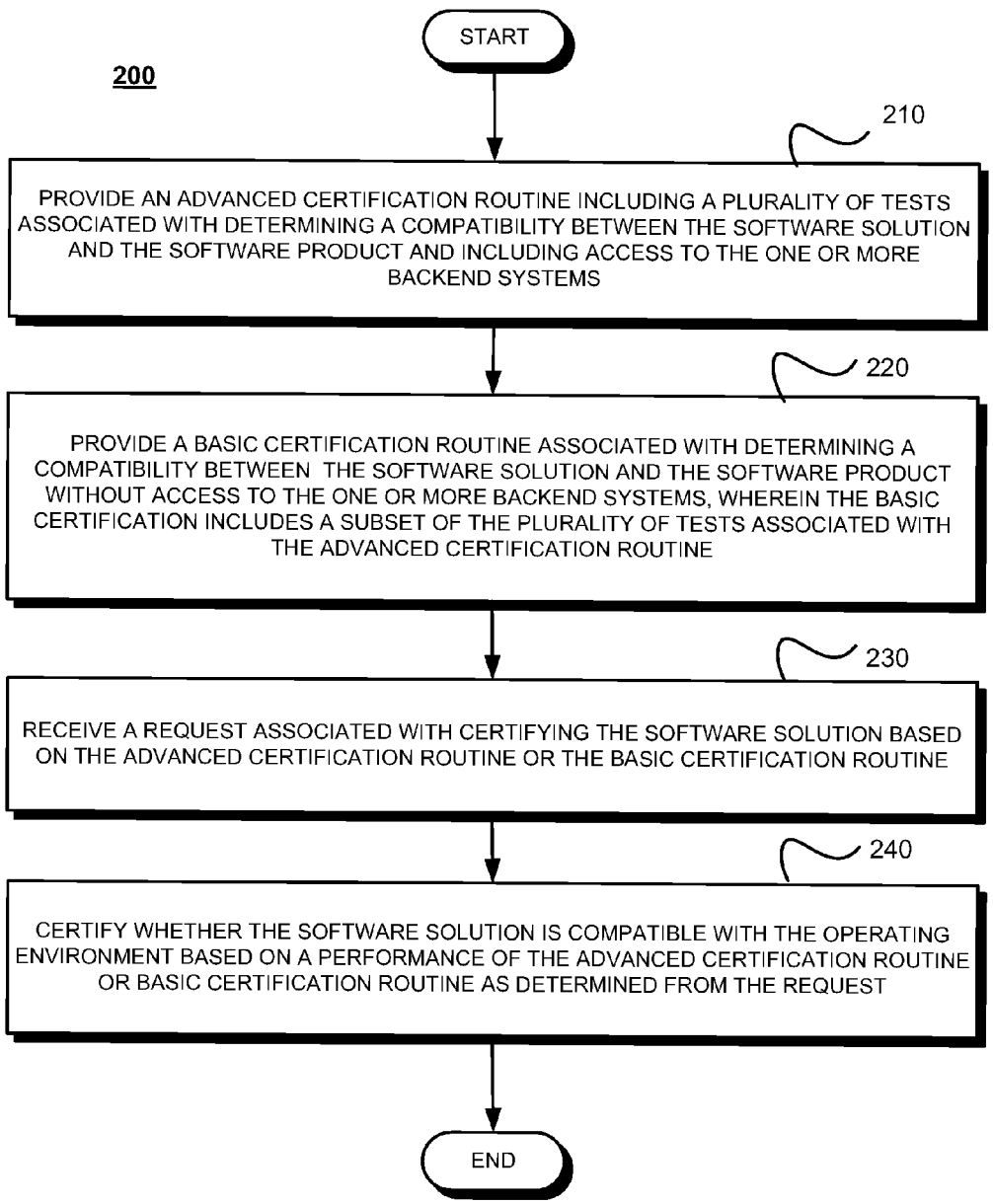
FIG. 2 is a flowchart illustrating example operations of the system of FIG. 1, according to an example embodiment.

FIG. 2 is a flowchart 200 illustrating example operations of the system of FIG. 1, according to an example embodiment. More specifically, FIG. 2 illustrates an operational flow 200 representing example operations related to a multi-tiered certification system 100.

After a start operation, an advanced certification routine including a plurality of tests associated with determining a compatibility between the software solution and the software product and including access to the one or more backend systems is provided (210). For example, as shown in FIG. 1, the ACR 102 may include a plurality of the tests 120 associated with determining a compatibility between the software solution 106 and the software product 112 and may include access to the one or more back-end system(s) 114.

A basic certification routine associated with determining a compatibility between the software solution and the software product without access to the one or more backend systems is provided, wherein the basic certification includes a subset of the plurality of tests associated with the advanced certification routine (220). For example, the BCR 104 may be associated with determining a compatibility between the software solution 106 and the software product 112, wherein the BCR 104 may include a subset of the tests 120 associated with the ACR 102. Then, for example, the BCR 104 may not be associated with the key 138 for accessing the back-end system(s) 114.

A request associated with certifying the software solution based on the advanced certification routine or the basic certification routine is received (230). For example, the certification service 116 may receive the request 140 associated with certifying the software solution 106 based on the ACR 102 or the BCR 104. According to an example embodiment, a software solution provider may provide the request 140 to the certification service 116.

The software solution is certified based on whether the software solution is compatible with the operating environment based on a performance of the advanced certification routine or basic certification routine as determined from the request (240). For example, the execution service 124 may execute the ACR 102 or BCR 104 based on the request 140. Then, for example, the certification engine 126 may certify (or not) the software solution 106 as being compatible with the operating environment 110 based on the execution. According to an example embodiment, the certification engine 126 may make the certification determination based on a comparison of the consistency level 128 (as determined from the execution) to the threshold 130, wherein the software solution 106 may be certified if the consistency level 128 exceeds the threshold 130.

Figure 3:
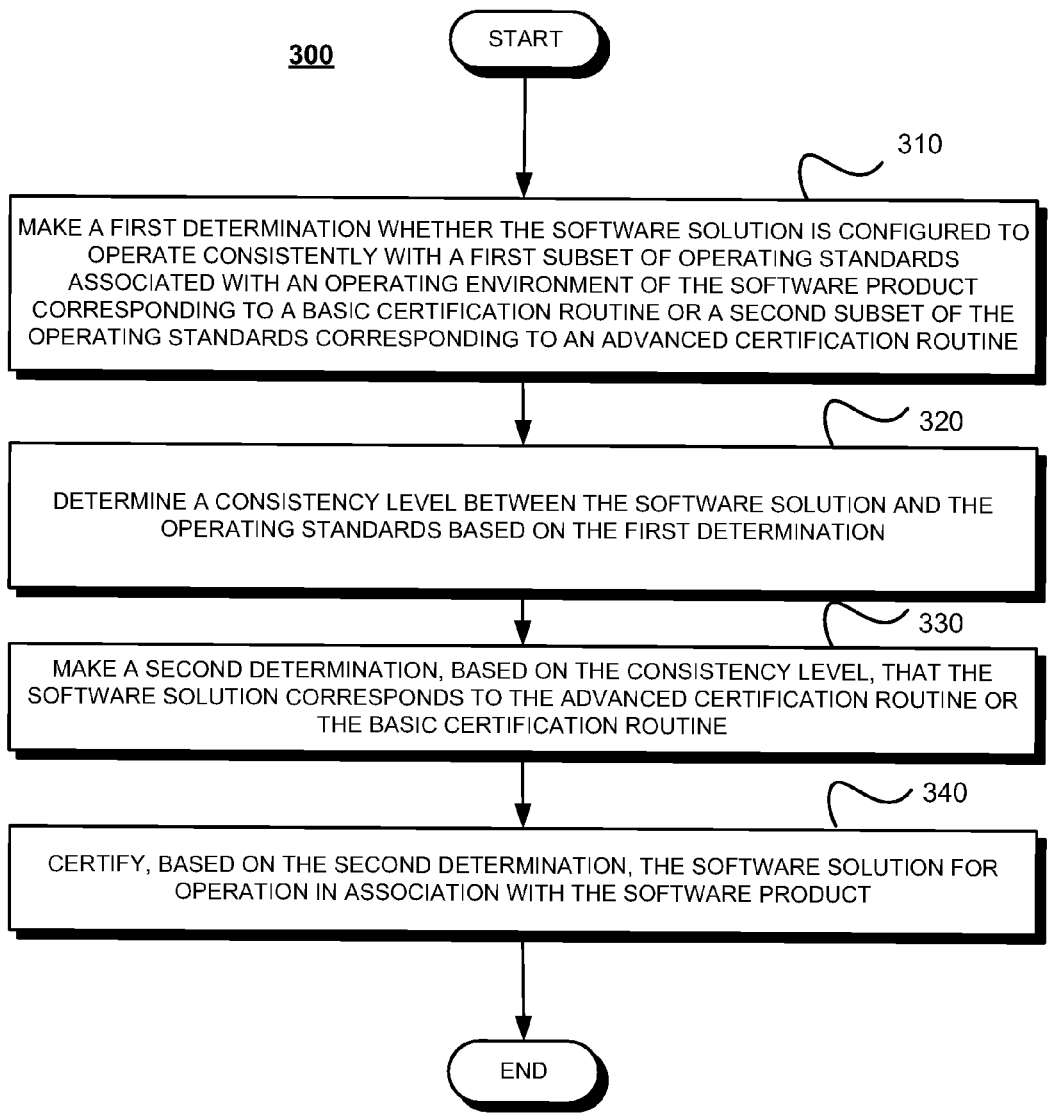
FIG. 3 is a flowchart illustrating example operations of the system of FIG. 1, according to an example embodiment.

FIG. 3 is a flowchart 300 illustrating example operations of the system of FIG. 1, according to an example embodiment. More specifically, FIG. 3 illustrates an operational flow 300 representing example operations related to a multi-tiered certification system 100.

After a start operation, a first determination is made as to whether the software solution is configured to operate consistently with a first subset of operating standards associated with an operating environment of the software product corresponding to a basic certification routine or a second subset of the operating standards corresponding to an advanced certification routine (310). For example, as shown in FIG. 1, the request 140 may be received by the certification service 116, where the request 140 indicates that the software solution 116 is configured to operate consistently with the operating standards 108 associated with the operating environment 110. Then, for example, based on the request 140, the execution service 124 may execute the tests 120 associated with the operating standards 108 and corresponding to the ACR 102 or the BCR 104.

A consistency level may be determined between the software solution and the operating standards based on the first determination (320). For example, the certification engine 126 may determine the consistency level 128 between the software solution 106 and the operating standards 108 based on the execution of the test 120 by the execution service 124.

A second determination that the software solution corresponds to the advanced certification routine or the basic certification routine is made based on the consistency level (330). For example, the certification engine 126 may determine that the software solution 106 corresponds to the ACR 102 or the BCR 104 based on the consistency level 128.

Based on the second determination, the software solution can be certified for operation in association with the software product (340). For example, the certification engine 126 may certify the software solution 106 for operation in association with the software product 112 based on the consistency level 128. According to an example embodiment, the certification engine 126 may compare the consistency level 128 to the threshold 130 to determine whether or not to certify the software solution 106.

Figure 4A:
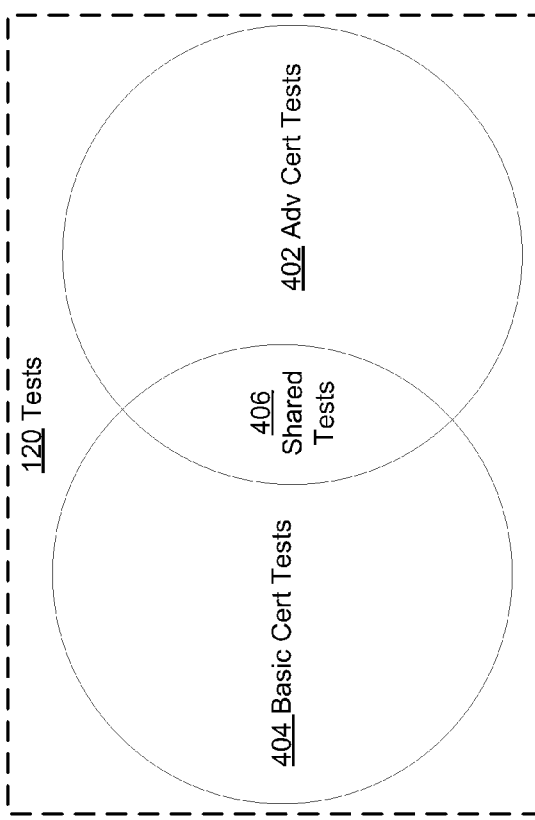
FIGS. 4A, 4B and 4C are diagrams of an example composition of the tests with regards to the advanced certification routine (ACR) and basic certification routine (BCR) of FIG. 1, according to example embodiments.
Figure 4C:
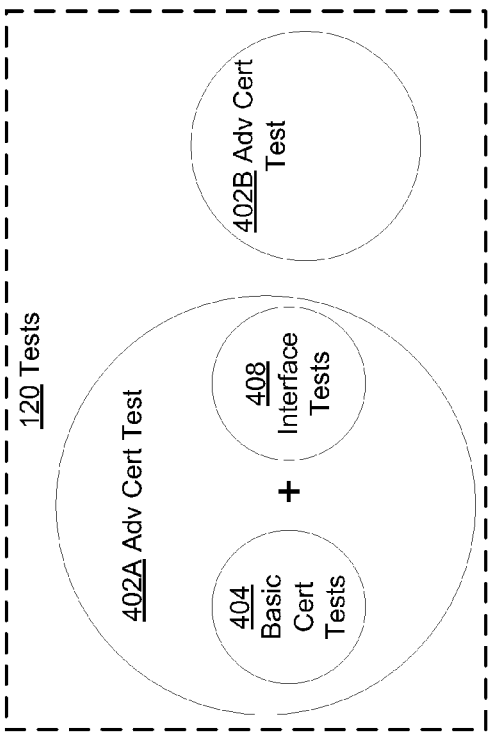
Figure 4B:
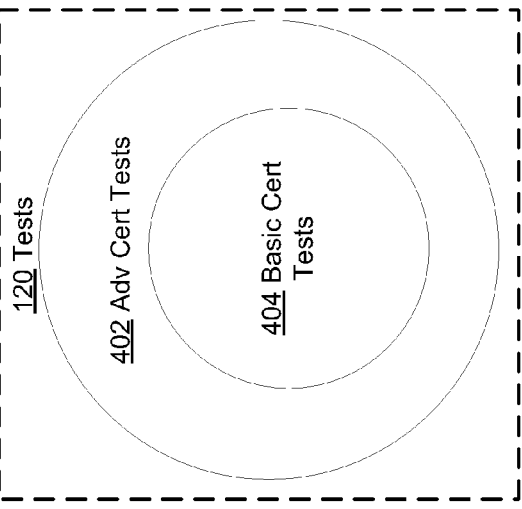

FIGS. 4A, 4B and 4C are diagrams of an example composition of the tests 120 with regards to the advanced certification routine (ACR) 102 and basic certification routine (BCR) 104 of FIG. 1, according to example embodiments. The advanced certification routine (ACR) tests 402 and basic certification routine (BCR) tests 404 may include one or more tests 120 for determining whether a software solution (e.g., 106) is compatible and/or consistent with one or operating standards (e.g., 108) associated with an operating environment (e.g., 110) of a software product (e.g., 112).

As referenced above, the BCR tests 404 may be associated with certifying the software solution for operation with the software product, whereby the ACR tests 402 may be associated with certifying the software solution for operation with the software product and one or more back-end systems (e.g., 114). In the example of FIG. 4A, the ACR tests 402 may include a first set of tests, and the BCR tests 404 may include a second set of tests. Then, for example, there may be one or more tests shared (e.g., shared tests 406) between the ACR tests 402 and the BCR tests 404. The shared tests 406 may include one or more tests to be executed or performed with regards to certifying the software solution 106, independent of whether an ACR certification or BCR certification is requested.

In FIG. 4B, the BCR tests 404 may include a subset of the ACR tests 402. In the example of FIG. 4B, a software solution product certified under the ACR tests 402 would necessarily pass the BCR tests 404. According to an example embodiment, the ACR tests 402 may be more specific than the BCR tests 404. For example, an ACR test 402 may test whether the software solution automatically starts or is initiated after deployment on an operating environment. Then, for example, a BCR test 404 may test whether the software solution either automatically starts after deployment on an operating environment or gives a user an option as to whether the user wishes the software solution to deploy.

In FIG. 4C the tests 120 may include two ACR tests 402A and 402B and a BCR test 404. The ACR tests 402A may include the BCR tests 404 and one or more interface tests 408.

The interface tests 408 may correspond to tests associated with an interface certification routine (e.g., ICR 134). The interface tests 408 may include one or more tests for determining if an interface (e.g., 132A) of the software solution has a similar look-and-feel of an interface (e.g., 132B) of the software product. For example, an interface test 408 may include a test to determine whether the software solution interface has a date/time indicator in the bottom right corner. Then, for example, the ACR tests 402A may include passing the BCR tests 404 and the interface tests 408.

Also, as shown in FIG. 4C, there may be the ACR tests 402B which may include a composition similar to that shown in FIG. 4A, FIG. 4B or some other composition. Then, for example, the software solution may be certified under the ACR tests 402B or the ACR tests 402A. The ACR tests 402A may provide an opportunity for a software solution previously certified under the BCR tests 404 to receive an ACR certification by passing the interface tests 408. The ACR tests 402A may, in some example embodiments, include one or more tests in addition to the BCR tests 404 and the interface tests 408.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A computer-implemented method for certifying whether a software solution is compatible with an operating environment that includes at least one backend system associated with a software product, the method comprising:

providing an advanced certification routine including a plurality of tests associated with determining a compatibility between the software solution and the software product and including access to the at least one backend system with which the software product is associated;

providing a basic certification routine associated with determining a compatibility between the software solution and the software product, wherein the basic certification includes a subset of the plurality of tests associated with the advanced certification routine and wherein the subset of the plurality of tests does not provide access to the at least one backend systems with which the software product is associated;

receiving a request associated with certifying the software solution, wherein the request includes an indication of whether the software solution should be certified based on a performance of the advanced certification routine or whether to the software solution should be certified based on a performance of the basic certification routine;

if the request indicates to certify the software solution based on the advanced certification routine then certifying whether the software solution is compatible with the operating environment by executing, by at least one processor of a computer system, the plurality of tests included in the advanced certification routine with regard to the software solution; and if the request indicates to certify the software solution based on the basic certification routine then certifying whether the software solution is compatible with the operating environment by executing, by at least one processor of a computer system, the subset of the plurality of tests included in basic certification routine with regard to the software solution.

2. The method of claim 1 wherein the providing an advanced certification routine comprises providing the advanced certification routine including the basic certification routine and at least one advanced certification test not associated with the basic certification routine.

3. The method of claim 2 wherein the at least one advanced certification test is associated with determining a consistency between an interface associated with the software solution and an interface associated with the software product.

4. The method of claim 2 wherein the at least one advanced certification test includes a test specifying how the software solution is to deploy within the operating environment.

5. The method of claim 1 wherein the providing a basic certification routine comprises providing the basic certification routine including the subset of the plurality of tests and at least one basic certification tests not included in the plurality of tests of the advanced certification routine.

6. The method of claim 1, wherein the certifying whether the software solution is compatible with the operating environment based on the performance of the advanced certification routine comprises determining a consistency level between the software solution and operational standards associated with the operating environment, wherein the operational standards are based on Java, and wherein certifying whether the software solution is compatible with the operating environment based on the performance of the advanced certification routine comprises determining a consistency level between the software solution and operational standards associated with the operating environment, wherein the operational standards are based on Java.

7. The method of claim 1 wherein the certifying whether the software solution is compatible with the operating environment based on the performance of the advanced certification routine comprises associating a key with the software solution, the key being associated with the advanced certification and configured for enabling access of the software solution to the at least one backend systems.

8. A certification system for certifying a software solution for operation with a software product, wherein the software solution includes a software application, software program, software product, or software code, the certification system comprising:

a memory storing executable instructions; and
at least one processor configured to execute the stored instructions to implement:
a definition engine configured to define a plurality of tests based on a plurality of operational standards associated with the software product;

a design module configured to group at least one of the tests into a plurality of certification routines, the plurality of certification routines including:
an interface certification routine being configured for determining a consistency between an interface of the software solution and an interface of the software product;
a first advanced certification routine associated with determining whether the software product is compatible with operational standards associated with an operating environment of the software product;
a basic certification routine associated with determining whether the software product is compatible with a portion of the operational standards associated with the operating environment of the software product; and
a second advanced certification routine comprising the basic certification routine and the interface certification routine; and
a certification engine configured to determine which of the first advanced certification routine, the second advanced certification routine, or the basic certification routine by which to certify the software solution for operation with the software product.

9. The certification system of claim 8 wherein the definition engine is configured to determine the plurality of tests from a data warehouse.

10. The certification system of claim 8 further comprising a test engine configured to execute the plurality of tests with regards to the software solution.

11. The certification system of claim 10 wherein the test engine is configured to execute the plurality of tests with regards to the software solution based on the determination by the certification engine.

12. The certification system of claim 8 wherein the definition engine is configured to associate a key with a software solution that is certified by the first advanced certification routine or the second advanced certification routine, the key enabling access by the software solution to at least one backend system associated with the software product.

13. The certification system of claim 8 wherein the certification engine is configured to determine which of the first advanced certification routine, the second advanced certification routine or the basic certification routine by which to certify the software solution based on a consistency level associated with an operation of the software solution with regard to at least one of the tests.

14. A computer-implemented method for certifying a software solution for operation in association with a software product, the method comprising:

making a first determination, by at least one processor of a computer system, that the software solution is configured to operate consistently with a first subset of operating standards associated with an operating environment of the software product corresponding to a basic certification routine or that the software solution is configured to operate consistently with a subset of the operating standards corresponding to an advanced certification routine;

determining, by at least one processor of the computer system, a consistency level between the software solution and the operating standards associated with the operating environment of the software product, wherein the determination is based on the first determination;

making a second determination, by at least one processor of the computer system, based on the determined consistency level, that the software solution corresponds to the advanced certification routine or that the software solution corresponds to the basic certification routine; and certifying, based on the second determination, the software solution for operation in association with the software product.

15. The method of claim 14 wherein determining the consistency level comprises operating the software solution with regards to the operating standards.

16. The method of claim 14 wherein the making a second determination comprises determining that the consistency level is greater than a threshold consistency level.

17. The method of claim 14 wherein the certifying comprises providing the software solution with a key for operating in association with the software product based on the second determination, wherein the key is associated with the advanced certification.

* * * * *